: 3,102,887
Patented Sept. 3, 1963

3,102,887
PREPARATION OF UNSYMMETRICALLY DISUBSTITUTED HYDRAZINES
Donald N. Thatcher, Pitman, N.J., assignor to E. I. du Pont de Nemours and Company, Wilmington, Del., a corporation of Delaware
No Drawing. Filed Apr. 13, 1959, Ser. No. 805,717
8 Claims. (Cl. 260—268)

The present invention relates to a process for the production of unsymmetrically disubstituted hydrazines. More particularly, the present invention relates to a process for the production of unsymmetrically disubstituted hydrazines by the catalytic hydrogenation of nitrosamines. This application is a continuation-in-part of my co-pending application Serial No. 544,367, filed November 1, 1955, now abandoned.

Heretofore, unsymmetrically disubstituted hydrazines, which are useful as fuels, intermediates for chemical syntheses, and the like, have been prepared by the chemical reduction of nitrosamines. However, this chemical reduction involves the use of costly reagents, for example, metallic zinc and acetic acid, or lithium aluminum hydride. Attempts also were made to prepare unsymmetrically disubstituted hydrazines by the catalytic hydrogenation of the corresponding nitrosamines. Paal and Yao (Chem. Ber. 63B, 65 (1930)) reported that hydrogenation of a dialkyl nitrosamine (di-n-propylnitrosamine) in the presence of a palladium-on-calcium carbonate catalyst resulted in the formation of only a very slight amount (3.7%) of di-n-propylhydrazine even though the nitrosamine-catalyst mixture had been agitated with hydrogen for an extended period of time (154 hours). More recently, Grillot (J. Am. Chem. Soc. 66, 2124 (1944) reported that the hydrogenation of diphenylnitrosamine in the presence of either Raney nickel or Adams platinum oxide catalyst resulted in the formation of only diphenylamine and ammonia. Later efforts to hydrogenate nitrosamines to hydrazines have been more successful. A copending patent application Serial No. 564,641, filed February 10, 1956, by G. V. Mock and assigned to the present assignee, describes a process by which unsymmetrical dialkyl hydrazines are prepared in improved yields by the catalytic hydrogenation of dialkyl nitrosamines. However, in the latter process the hydrazines could be produced in improved yields only when a carbon-supported palladium, platinum, or rhodium metal catalyst was used. Other hydrogenation catalysts were ineffective. The maximum conversion obtained was about 80%, the average conversions being between about 60% and 70%.

Accordingly, an object of the present invention is to provide an improved process for the production of unsymmetrically disubstituted hydrazines. Another object of the present invention is to provide an economical process for the production of unsymmetrically disubstituted hydrazines from nitrosamines. A still further object of the present invention is to provide a process in which nitrosamines are hydrogenated in the presence of any one of several catalysts to form unsymmetrically disubstituted hydrazines in unusually high yields. Other objects will become apparent as the invention is further described.

I have found that the foregoing objects are achieved when I provide a solution having an ionic strength of at least 0.6 as a solvent medium for the catalytic hydrogenation of a nitrosamine.

In accordance with one embodiment of the present process, a solution having an ionic strength of at least 0.6 is prepared by dissolving a sufficient quantity of a salt in a suitable solvent, the nitrosamine is dissolved in the resulting solution, the hydrogenation catalyst is added to the solution, and hydrogen is introduced into the system thus formed. Alternatively, the salt, nitrosamine, and catalyst may be added simultaneously or in any order to the solvent.

The following examples serve to illustrate specific embodiments of the method of carrying out the process of the present invention. However, they will be understood to be illustrative only and not to limit the invention in any manner. The parts in the examples are parts by weight unless otherwise designated. The yields given in the examples are based upon the amount of the hydrazine formed as compared to the amount theoretically formed from the amount of selected starting material which has reacted. The conversions given in the examples are based upon the amount of the hydrazine formed as compared to the amount theoretically formed from the amount of selected starting material which was charged to the reactor. Unless otherwise designated, the yields and conversions are based upon the nitrosamine. The amount of unsymmetrically disubstituted hydrazine obtained was determined by oxidation by dilute ceric sulfate solution.

*Example 1*

Ten parts of calcium chloride was dissolved in a mixture of 21 parts of 95% ethanol and 25 parts of water, providing a solution having an ionic strength of about 6.0. Ten parts of diethylnitrosamine was dissolved in this solution, one part of 5% rhodium-on-carbon was added, and hydrogen was introduced into the system at an initial pressure of 1000 p.s.i.g. The hydrogenation was allowed to proceed at 72–80° C. for 1 hour, during which time the reaction mixture was agitated. At the end of this time, the reactor was vented, and the contents were cooled. After the catalyst was removed from the cooled mixture by filtration, the filtrate was analyzed for unsymmetrical diethylhydrazine. The analysis showed that unsymmetrical diethylhydrazine was obtained at a conversion of 94% and in a quantitative yield (100%).

*Example 2*

Twenty parts of diethylnitrosamine was dissolved in a solution of 45 parts of ammonium acetate in a mixture of 62 parts of 95% ethanol and 75 parts of water having an ionic strength of about 2. After the addition of 2 parts of 10% palladium-on-carbon, hydrogen was introduced into the system at an initial pressure of 50 p.s.i.g. The hydrogenation was allowed to proceed at 60° C. for 5 hours, during which time the reaction mixture was agitated. At the end of this time, the reactor was vented and the contents were treated as described in Example 1. A quantitative yield of unsymmetrical diethylhydrazine was obtained (91% conversion).

*Example 3*

Fifteen parts of dimethylnitrosamine was dissolved in 150 parts of water containing 15 parts of sodium chloride, the ionic strength of the solution being 1.7, and 1 part of 10% palladium-on-carbon was added to the solution. Hydrogen was introduced into the system at an initial pressure of 53 p.s.i.g., and the hydrogenation was carried out at 60° C. for 23 hours, agitation being provided during this time. After the hydrogenation was completed, the reactor was vented. The contents were treated as described in Example 1. A quantitative yield of unsymmetrical dimethylhydrazine was obtained (72% conversion).

*Example 4*

Five hydrogenations of nitrosamines to the corresponding unsymmetrical hydrazines were carried out according to the procedure described in Example 1 with the exception that in each experiment a different salt replaced the calcium chloride. The results are summarized in the following table.

| Expt. | Parts Nitrosamine [1] | Salt (Parts) | Solvent (Parts) | Ionic Strength ($\mu$) of Salt Solution [3] | Parts Catalyst [2] | Temp. (° C.) | Initial $H_2$ Pressure (p.s.i.g.) | Reaction Time (Hrs.) | Unsymmetrical Dialkyl Hydrazine | |
|---|---|---|---|---|---|---|---|---|---|---|
| | | | | | | | | | Percent Yield | Percent Conversion |
| A [4] | 20 | $LaCl_3 \cdot 7H_2O$ (5) | 95% EtOH (62)+ $H_2O$ (75). | 0.6 | 2 | 60 | 52 | 4 | 75 | 75 |
| B | 20 | $MgSO_4$ (5) | 95% EtOH (62)+ $H_2O$ (70). | 1.2 | 2 | 60 | 50 | 4 | 100 | 74 |
| C | 10 | LiCl (32) | 95% EtOH (31)+ $H_2O$ (37). | 11 | 1 | 48–63 | 1000 | 0.75 | 100 | 71 |
| D | 11 | NaCl (10) | $H_2O$ (50) | 3.4 | 1 | 70 | 1000 | 15 | 100 | 92 |
| E | 20 | $(CH_3)_4NBr$ (31) | 95% EtOH (62)+ $H_2O$ (75). | 1.5 | 2 | 60 | 50 | 14 | 100 | 81 |

[1] Diethylnitrosamine in Expts. A, B, C, and E; dimethylnitrosamine in Expt. D.
[2] 10% palladium-on-carbon.
[3] $\mu = \tfrac{1}{2} \Sigma \, c_i \cdot z_i^2$ where $c_i$ is the concentration of each ion and $z_i$ is its valence.
[4] In Expt. A the filtrate was distilled to separate the hydrazine.

Example 5

In the following experiments, hydrogenations of nitrosamines to the corresponding unsymmetrically disubstituted hydrazines were carried out according to the procedure described in Example 1 except that different solvents, catalysts, pressures, and ionic strengths were used. In each experiment the yield was quantitative (100%).

chloride-ethanol, water solution was 2. The mixture was maintained at 60° C. for 14 hours under agitation. After completion of the hydrogenation, the reactor was vented and the contents were treated according to the method of Example 1. As shown by analysis, a quantitative yield (26% conversion) of N-methyl-N-phenylhydrazine was obtained.

| Expt. | Parts Nitrosamine [1] | Salt (Parts) | Solvent (Parts) | Ionic Strength ($\mu$) of Salt Solution [2] | Catalyst (Parts) | Temp. (° C.) | Initial $H_2$ Pressure (p.s.i.g.) | Reaction Time (Hrs.) | Percent Conversion to the Hydrazine |
|---|---|---|---|---|---|---|---|---|---|
| F | 20 | $CaCl_2$ (5) | $H_2O$ (150) | 0.9 | 10% Pd-on-C (2) | 60 | 50 | 12 | 89.6 |
| G | 20 | $CaCl_2$ (10) | 95% EtOH (62)+$H_2O$ (75). | 2 | 10% Pd-on-C (2) | 60 | 50 | 3.75 | 82.5 |
| H | 20 | $CaCl_2$ (43) | 95% EtOH (62)+$H_2O$ (75). | 9 | 10% Pd-on-C (2) | 60 | 50 | 15.5 | 89.5 |
| I | 20 | $CaCl_2$ (10) | 95% EtOH (62)+$H_2O$ (75). | 2 | Raney Ni (2) | 60 | 52 | 13 | 96 |
| J | 31 | $CaCl_2$ (8) | 95% EtOH (82)+$H_2O$ (100). | 1.2 | 10% Pd-on-C (3) | 46–54 | Atmospheric. | 6 | 30 |
| K | 20 | LiCl (5) | 95% EtOH (62)+$H_2O$ (75). | 0.9 | 10% Pd-on-C (2) | 60 | 50 | 2.25 | 78.4 |
| L | 20 | LiCl (15) | 95% EtOH (62)+$H_2O$ (75). | 2.5 | 10% Pd-on-C (2) | 60 | 50 | 2.25 | 81.8 |
| M | 20 | LiCl (45) | MeOH (120)%$H_2O$ (30). | 7 | 10% Pd-on-C (1) | 60 | 50 | 7.5 | 74.5 |
| N | 15 | $Ca(OAc)_2$ (5) | $H_2O$ (70)+AcOH (10). | 1.9 | 10% Pd-on-C (1) | 45 | 52 | 5.25 | 30 |
| O | 15 | $CaCl_2$ (10) | $H_2O$ (150) | 1.8 | 10% Pt-on-C (1) | 45 | 52 | 9 | 84 |

[1] Diethylnitrosamine in all experiments, except dimethylnitrosamine in Experiments N and O.
[2] $\mu = \tfrac{1}{2} \Sigma \, c_i \cdot z_i^2$ where $c_i$ is the concentration of each ion and $z_i$ is its valence.

Example 6

Eight parts of diisobutylnitrosamine was dissolved in 50 parts of water containing 5 parts of calcium chloride (ionic strength, 2.7), and 1 part of 10% palladium-on-carbon was added to the solution. Hydrogen was introduced into the system at an initial pressure of 1000 p.s.i.g., and the hydrogenation was carried out at 55–75° C. for 2 hours, agitation being provided during the reaction. After the hydrogenation was completed, the reactor was vented and the contents were treated as described in Example 1. A quantitative yield of unsymmetrical diisobutylhydrazine was obtained (20.3% conversion).

Example 7

Hydrogen at an initial pressure of 1000 p.s.i.g. was introduced into a reactor containing 10 parts of diphenylnitrosamine, 1 part of 5% palladium-on-carbon, 10 parts of calcium chloride, 33 parts of 95% ethanol, and 20 parts of water (ionic strength, 5.4). The mixture was maintained at 80° C. for five hours under agitation. After completion of the hydrogenation, the reactor was vented and the contents were treated as described in Example 1. A quantitative yield of unsymmetrical diphenylhydrazine was obtained (55% conversion).

Example 8

Hydrogen at an initial pressure of 52 p.s.i.g. was introduced into a reactor containing 14 parts of N-methyl-N-nitrosaniline, 10 parts of calcium chloride, 0.1 part of 10% palladium-on-carbon, 62 parts of 95% ethanol, and 75 parts of water. The ionic strength of the calcium

Example 9

Eleven parts of dicyclohexylnitrosamine was dissolved in a mixture of 33 parts of 95% ethanol and 20 parts of water which contained 10 parts of calcium chloride (ionic strength, 5.4). After the addition of 1 part of 5% rhodium-on-carbon to the solution, the reactor was pressurized to 1000 p.s.i.g. with hydrogen, and the hydrogenation was allowed to proceed at 80° C. for 5 hours, during which time the reaction mixture was agitated. At the end of this time, the reactor was vented and the contents were treated as described in Example 1. A quantitative yield of unsymmetrical dicyclohexylhydrazine was obtained (50% conversion).

Example 10

Hydrogen at an initial pressure of 50 p.s.i.g. was introduced into a reactor containing 14 parts of N-methyl-N-nitrosocyclohexylamine, 10 parts of calcium chloride, 0.1 part of 10% palladium-on-carbon, 62 parts of 95% ethanol, and 75 parts of water. The ionic strength of the calcium chloride-ethanol, water solution was 2. The mixture was maintained at 60° C. for 12 hours under agitation. After completion of the hydrogenation, the reactor was vented and the contents were treated according to the method of Example 1. N-methyl-N-cyclohexylhydrazine was obtained in quantitative yield (80% conversion).

Example 11

Eight parts of diethanolnitrosamine was dissolved in 50 parts of water containing 1.5 parts of calcium chloride (ionic strength, 0.8), and 0.5 part of 10% palladium-on-carbon was added to the solution. Hydrogen was introduced into the system at an initial pressure of 1000 p.s.i.g., and the hydrogenation was carried out at 30–70° C. for 2 hours, agitation being provided during this time. After the hydrogenation was completed, the reactor was vented and the contents were treated as described in Example 1. A quantitative yield of N,N-bis($\beta$-hydroxyethyl)hydrazine was obtained (72.5% conversion).

*Example 12*

Six parts of N-nitrosopiperidine was dissolved in 50 parts of water containing 5 parts of calcium chloride (ionic strength, 2.7), and 1 part of 10% palladium-on-carbon was added to the solution. Hydrogen was introduced into the system at an initial pressure of 1000 p.s.i.g., and the hydrogenation was carried out at 60° C. for 1 hour, during which time the reaction mixture was agitated. After completion of the hydrogenation, the reactor was vented and the contents were treated as described in Example 1. The hydrazine, N-aminopiperidine, was obtained in quantitative yield and conversion. The homologs of piperidine, i.e., pyrrolidine and hexamethylenimine, react similarly with hydrogen in a solution having an ionic strength of at least 0.6 to form N-aminopyrrolidine and N-aminohexamethylenimine, respectively.

*Example 13*

Seven parts of N,N'-dinitrosopiperazine was dissolved in 50 parts of water containing 5 parts of calcium chloride (ionic strength, 2.7), and 1 part of 10% palladium-on-carbon was added to the solution. Hydrogen was introduced into the system at an initial pressure of 1000 p.s.i.g., and the hydrogenation was carried out at 64–71° C. for 1.5 hours, agitation being provided during this time. After the hydrogenation was completed, the reactor was vented and the contents were treated as described in Example 1. A quantitative yield of the dihydrazine, N,N'-diaminopiperazine, was obtained (100% conversion).

In a repeat of the foregoing experiment, 2 parts of the catalyst, a solvent consisting of 25 parts of 95% ethanol and 25 parts of water, and a temperature of 60° C. were used. The hydrogenation was completed in 3 hours, and the conversion and yield again were 100%.

*Example 14*

Hydrogen at an initial pressure of 51 p.s.i.g. was introduced into a reactor containing 23 parts of N-nitrosomorpholine, 30 parts of calcium chloride, 2 parts of 10% palladium-on-carbon, and 150 parts of water. The ionic strength of the calcium chloride-water solution was 6.5. The mixture was maintained at 60° C. for 23 hours under agitation. After completion of the hydrogenation, the reactor was vented and the contents were treated according to the method of Example 1. As shown by analysis, a quantitative yield (82.7% conversion) of the hydrazine, N-aminomorpholine, was obtained.

As is illustrated in the following examples, the process of the present invention may be combined advantageously with the process for making nitrosamines described in detail in a copending patent application Serial No. 582,084, filed May 2, 1956, now abandoned, by E. L. Reilly and assigned to the present assignee. For example, a secondary amine may be dissolved in a solvent containing a dissolved salt and a catalyst, nitric oxide may be introduced into the reactor to form a nitrosamine, the unreacted nitric oxide may be removed from the system, hydrogen may be passed into the reactor, and thereafter the corresponding unsymmetrically disubstituted hydrazine may be recovered.

*Example 15*

Seven parts of diethylamine was dissolved in 40 parts of methanol which contained 14 parts of lithium chloride (ionic strength, 8.3), and 2 parts of 10% palladium-on-carbon was added to the solution. The reactor was pressurized with nitric oxide to 300 p.s.i.g., and the mixture was maintained at 55–65° C. for 70 minutes. The system then was flushed with nitrogen, and hydrogen was introduced to a pressure of 1000 p.s.i.g. The reaction mixture was agitated and held at a temperature of 55–70° C. for 12 hours, after which time the reactor was vented, and the contents were cooled. After the catalyst was removed from the cooling mixture by filtration, the filtrate was analyzed for unsymmetrical diethylhydrazine, which was obtained in a quantitative yield (78% conversion based upon the amine).

*Example 16*

To 10 parts of calcium chloride dissolved in 42 parts of water (ionic strength, 6.3) were added 14 parts of dimethylamine and 4 parts of 10% palladium-on-carbon. Nitric oxide was introduced into the reactor to a pressure of 545 p.s.i.g., and the reaction temperature was maintained at 50° C. for 1.5 hours. Then, the reactor was flushed with nitrogen, and hydrogen was passed into a pressure of 1000 p.s.i.g. The reaction mixture was agitated and maintained at a temperature of 80–85° C., and the hydrogenation was allowed to proceed for 4.5 hours. After the completion of the hydrogenation, the mixture was cooled and the catalyst was removed by filtration. Analysis of the filtrate showed that a quantitative yield (74% conversion based upon the amine) of unsymmetrical dimethylhydrazine was obtained.

*Example 17*

Seven parts of diethylamine was added to 40 parts of methanol containing ten parts of calcium chloride (ionic strength, 6.8), and 2 parts of 10% palladium-on-carbon was added to the solution. The nitrosation was carried out at a nitric oxide pressure of 300 p.s.i.g. and a temperature of 40° C. for 2 hours. At the end of this time, the reactor was flushed with nitrogen. Hydrogen was passed into a pressure of 1000 p.s.i.g., and the reaction mixture was agitated and the temperature maintained at 40–50° C. for 5 hours. Then, the mixture was cooled, the catalyst was filtered out, and the filtrate was analyzed for the hydrazine. Unsymmetrical diethylhydrazine was obtained in a quantitative yield (60% conversion based upon the amine).

As is illustrated in the preceding examples, excellent yields of unsymmetrically disubstituted hydrazines are obtained when hydrogen is introduced into a solution of a nitrosamine in a solvent medium having an ionic strength of at least 0.6. The presence of the dissociated salt is the critical feature of the process of the present invention. Surprisingly, the presence of the dissociated salt makes possible not only the formation of the hydrazines in yields higher than those previously obtainable, but also permits the use of a greater number of catalysts. As may be seen from the examples, the nature of the particular cation and anion of the salt used has no significant effect on the course of the hydrogenation and on the yields obtained. Thus, essentially the same results were obtained when salts having an inorganic cation, e.g., calcium, lithium, sodium, lanthanum, magnesium, and ammonium ions, were used as when salts having an organic cation, e.g., the tetramethylammonium ion, were used. Similarly, equally good results were obtained when salts having an inorganic anion, e.g., the chloride, bromide, and sulfate ions, were used as when salts having an organic anion, e.g., the acetate ion, were used. Furthermore, essentially the same results were obtained with salts having uni-, bi-, and trivalent cations and also with those having uni- and bivalent anions. Thus, it is evident that the effect of the salt in the present process must be due not to the specific nature of any one salt, but rather to a property which all salts, regardless of chemical composition, have in common, i.e., the property of dissociating into ions in solution.

The dissociation of any electrolyte in solution has the result of imparting to the solution a certain ionic strength. As is known, the ionic strength of a solution is a property which is not dependent on any specific property of the electrolyte but is a measure of the electrical field due to the ions in solution and is dependent only on the number of ions in solution and the valences of the ions. Inasmuch as it has been shown that the results achieved in the present process are dependent on the dissociation of a salt in a solvent rather than on the specific nature of the salt, it would appear that the function of the salt is to create a certain electrical field in the solution, i.e., to impart a certain ionic strength to the solution. I have found that an unsymmetrically disubstituted hydrazine is the chief product of the catalytic hydrogenation of a nitrosamine when the reaction medium is a solution having an ionic strength of at least 0.6. The ionic strength is denoted by the symbol $\mu$ and is defined as half the sum of the terms obtained by multiplying the molality (or concentration) of each ionic species present in the solution by the square of its valence; thus, $$\mu = \tfrac{1}{2} \Sigma c_i \cdot z_i^2$$

where $c_i$ is the actual concentration (or molality) of each ion and $z_i$ is its valence. For a strong electrolyte, in which ionization is complete, the term $c_i$ may be derived directly from the concentration of the solute, but for a weak or intermediate electrolyte, it is necessary in addition to introduce the degree of dissociation, $\alpha$. Thus, in calculating the ionic strength of a weak electrolyte, the ionic concentration must be multiplied by the degree of dissociation, $\alpha$. Any salt which is capable of dissociating in a solvent for the nitrosamine to such a degree as to afford a solution having an ionic strength of at least 0.6 is suitable for use in the present process, provided that the salt does not dissociate into ions capable of reacting with the hydrazine formed. Included in this classification are such salts as halides, sulfates, phosphates, nitrates, silicates, carbonates, borates, sulfonates, and carboxylates, e.g., acetates, propionates, oxalates, benzoates, citrates, and tartrates. The anions and cations of the salts may be monovalent or polyvalent inasmuch as the valency is taken into consideration in the ionic strength calculation. The suitability of any particular salt may readily be determined by calculation of the ionic strength of a saturated solution of the salt from the molal concentration of the solution according to the equation given above.

The amount of salt used in the present process must be sufficient to provide the aforesaid ionic strength of 0.6 or greater. Thus, the minimum operable concentration for a particular salt may readily be determined by substitution of the factor 0.6 for $\mu$ and the known valences of the ions in the aforementioned equation. As is shown in Example 5, the presence of the salt in an amount greatly in excess of the amount required to favor hydrogenation to the hydrazine is not deleterious to the present process. As may be seen by a comparison of the results of experiments F and H in Example 5, essentially identical results were obtained when forty-three parts of calcium chloride was used as when five parts of the same salt was used per 150 parts and 137 parts of solvent, respectively, i.e., at molalities of 0.3 and 3 and ionic strengths of 0.9 and 9, respectively. Similarly, as is shown by the results of experiments K and M, essentially the same results were obtained when lithium chloride solutions of ionic strengths of 0.9 and 7 were used. Inasmuch as such an extreme excess of salt has no harmful effect on the process, it follows that the upper limit on the amount of salt used will be dictated only by the solubility limit of a particular salt in the solvent used.

The solvent used must be a solvent for both the nitrosamine and the salt. While a large number of known solvents fit the foregoing requirements, water, 1 to 3 carbon alkanols, and mixtures of water and the 1 to 3 carbon alkanols represent readily available, low-cost solvents and are preferred.

As stated before, the presence of the dissolved salt makes possible the use of hydrogenation catalysts generally. Particularly suitable hydrogenation catalysts are the metals of group VIII of the periodic table. These metals may be used in finely divided form or supported by a suitable material, e.g., carbon. Such metals include rhodium, ruthenium, palladium, platinum, osmium, iridium, iron, cobalt, and nickel. However, palladium-on-carbon, rhodium-on-carbon, platinum-on-carbon, and Raney nickel are preferred. The amount of catalyst employed depends upon such reaction variables as temperature, pressure, duration of run, etc. In general, a catalyst concentration of one part of catalyst (based upon the weight of metal) per million parts of nitrosamine is operable. However, since the rate of the hydrogenation is influenced by the catalyst concentration, I prefer to employ a catalyst concentration of about 250 parts or more of catalyst (based upon the weight of the metal) per million parts of nitrosamine in order to decrease the reaction time. An excess of catalyst is not deleterious to the process of the present invention because the excess catalyst has no harmful effects. Moreover, after completion of the hydrogenation, the catalyst may be removed from the reaction mixture by filtration and reused or regenerated by a conventional method.

The present process may be carried out at temperatures between the freezing point of the mixture and the decomposition point of the hydrazine under the reaction conditions. However, the use of a temperature within the range of 20° C. and the decomposition point of the hydrazine under the reaction conditions gives high yields and is preferable from the standpoint of economics. The use of lower temperatures requires external cooling and increased reaction times, whereas the use of higher temperatures causes decomposition.

In effecting the hydrogenation, pressures ranging from atmospheric to the maximum pressure permitted by the mechanical limitations of the available equipment can be employed, i.e., 1–1000 atmospheres. Although entirely satisfactory yields of the hydrazines are obtained when atmospheric pressure is used, the use of higher pressures is advantageous because thereby the reaction rate is increased and the reaction time is decreased.

As may be seen by reference to the examples, the time required for the completion of the hydrogenation varies. The reaction time is dependent upon such reaction variables as temperature, pressure, catalyst concentration, etc. Therefore, the time required for the completion of this reaction is a controllable factor rather than a limiting factor.

As is illustrated in the preceding examples, excellent yields of unsymmetrically disubstituted hydrazines are obtained when nitrosamines are catalytically hydrogenated in a solution having an ionic strength of at least 0.6. The term "nitrosamines" generally has been accepted in the art to mean N-nitroso secondary amines, and such is the meaning intended herein. That is, the starting materials for the present process are secondary amines in which the amino hydrogen atom has been replaced by a nitroso radical. I have found that the nature of the chemical radicals attached to the $>$N—N$=$O radical of the nitrosamine does not affect the course of the hydrogenation. Thus, while the selection of the most favorable reaction conditions, i.e., temperature, pressure, catalyst, and solvent, to be used with a particular nitrosamine will be dependent on the nature of the radicals attached to the $>$N—N$=$O radical of the nitrosamine, the course of the hydrogenation will be essentially unaffected by these groups and the final product will be an unsymmetrically disubstituted hydrazine regardless of the nitrosamine used.

The examples illustrate the wide variety of nitrosamines which may be hydrogenated to unsymmetrically disubstituted hydrazines by the process of the present invention. Thus, the reaction is seen to be applicable to dialkyl nitrosamines, e.g., dimethyl-, diethyl-, and diisobutylnitrosamines; to dicylcoalkyl nitrosamines, e.g., dicyclohexylnitrosamine; to diphenylnitrosamine; to alkyl phenyl nitrosamines, e.g., N-methyl-N-nitrosoaniline; to alkyl cycloalkyl nitrosamines, e.g., N-methyl-N-nitrosocyclohexylamine; and to N-nitroso saturated mononuclear cyclic amines, also known as imines, i.e., amines in which the nitrogen atom of the amino group is a member of the ring structure, such as N-nitrosopiperidine and N-nitrosomorpholine, as well as to N,N'-dinitroso diimines, e.g., N,N'-dinitrosopiperazine. However, the present process is in no way limited in its applicability to the particular nitrosamines exemplified. As is shown in the examples, excellent yields of unsymmetrically disubstituted hydrazines are obtained regardless of the nature of the chemical groups attached to the $>$N—N=O group. Therefore, by the term "alkyl," I intend to include all saturated radicals of the general formula $C_nH_{2n+1}$, and by the term "cycloalkyl" all saturated monocyclic radicals which fit the general formula $C_nH_{2n}$. Because of ready availability, I prefer to use nitrosamines in which the alkyl groups contain 1 to about 8 carbon atoms and in which the cycloalkyl groups contain 5 to 7 carbon atoms. The above-mentioned N-nitroso saturated cyclic amines in which the amine nitrogen is a ring member may be described by the formula:

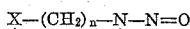

$$X—(CH_2)_n—N—N=O$$

in which X, without regard to its ring position, is a methylene or $>$N—N=O radical or a hetero atom, i.e., a sulfur or oxygen atom; and in which, for purposes of ready availability of the compounds, the total number of ring members preferably is 5 to 7.

Other suitable nitrosamines for use in the present process are those in which the hydrogen atoms in the alkyl, cycloalkyl, and phenyl radicals attached to the $>$N—N=O radical may be substituted by a variety of atoms or radicals, e.g., halogen, cyano, or hydroxyl radicals. Also, the hydrogen atoms in the cycloalkyl and phenyl radicals may be substituted by alkyl radicals, while the hydrogen atoms in the alkyl radicals may be substituted by cycloalkyl or phenyl radicals. Similarly, the hydrogen atoms of the methylene radicals in the N-nitroso saturated cyclic amines may be substituted by a variety of atoms or radicals, e.g., halogen, cyano, hydroxyl, or alkyl radicals. If desired, a nitrosamine may be used in which the radicals attached to the $>$N—N=O radical, or the substituents on the alkyl, cycloalkyl, and phenyl radicals attached to the $>$N—N=O radical and those on the methylene radicals in the N-nitroso saturated cyclic amines are of such a nature as to be reduced under the conditions of the present process. While such radicals will themselves be reduced during the reaction, an unsymmetrically disubstituted hydrazine will still be obtained.

The hydrazines produced by the process of the present invention may be separated from the reaction mixtures by distillation. For example, after the hydrogenation is completed, the mixture is cooled, and the catalyst is removed by filtration. The filtrate then is distilled to remove the hydrazine. The material remaining after the distillation may be recycled. Alternatively, the hydrazine may be removed from the filtrate by ether extraction.

Although the process has been illustrated as a batchwise process, the effecting of the process in a continuous manner is equally feasible. For example, the mixture of nitrosamine, salt, catalyst, and solvent may be introduced continuously into a reactor into which hydrogen is continuously passed, while the hydrogenation product is continuously removed.

The invention has been described in detail in the foregoing. It will be apparent to those skilled in the art that many variations are possible without departure from the scope of the invention. I intend, therefore, to be limited only by the following claims.

I claim:

1. In a process for preparing an unsymmetrically disubstituted hydrazine by the catalytic hydrogenation of a compound selected from the group consisting of R(R')NNO, N-nitrosopiperidine, N,N'-dinitrosopiperazine and N-nitrosomorpholine where R and R' are selected from the group consisting of 1 to 8 carbon alkyl, 5 to 7 carbon cycloalkyl, and phenyl, the improvement which comprises conducting said hydrogenation in a salt solution having an ionic strength of at least 0.6, the solvent for said salt solution being a solvent for said nitrosamine selected from the group consisting of water, 1–3 carbon alkanols, and mixtures of water and 1–3 carbon alkanols, and the salt in said solution having a cation selected from the group consisting of metal and ammonium ions, and an anion selected from the group consisting of halide, sulfate, phosphate, nitrate, carbonate, borate, silicate, sulfonate and carboxylate ions.

2. A process according to claim 1 wherein the hydrogenation is carried out at a temperature between 20° C. and the decomposition temperature of the resultant hydrazine under the reaction conditions.

3. A process according to claim 1 wherein the salt is calcium chloride.

4. A process according to claim 1 wherein the salt is lanthanum chloride.

5. A process according to claim 1 wherein a palladium-on-carbon catalyst is used.

6. A process for preparing unsymmetrical dimethyl hydrazine by the catalytic hydrogenation of dimethyl nitrosamine which comprises conducting said hydrogenation in the presence of a catalyst selected from the group consisting of metals of group VIII of the periodic table in a salt solution having an ionic strength of at least 0.6, the solvent for said salt solution being a solvent for dimethyl nitrosamine selected from the group consisting of water, 1–3 carbon alkanols, and mixtures of water and 1–3 carbon alkanols, and the salt in said salt solution having a cation selected from the group consisting of metal and ammonium ions, and an anion selected from the group consisting of halide, sulfate, phosphate, nitrate, carbonate, borate, silicate, sulfonate and carboxylate ions.

7. A process for preparing unsymmetrical diethyl hydrazine by the catalytic hydrogenation of diethyl nitrosamine which comprises conducting said hydrogenation in the presence of a catalyst selected from the group consisting of metals of group VIII of the periodic table in a salt solution having an ionic strength of at least 0.6, the solvent for said salt solution being a solvent for diethyl nitrosamine selected from the group consisting of water, 1–3 carbon alkanols, and mixtures of water and 1–3 carbon alkanols, and the salt in said salt solution having a cation selected from the group consisting of metal and ammonium ions, and an anion selected from the group consisting of halide, sulfate, phosphate, nitrate, carbonate, borate, silicate, sulfonate and carboxylate ions.

8. A process for preparing unsymmetrical N,N'-diaminopiperazine by the catalytic hydrogenation of N,N'-dinitrosopiperazine which comprises conducting said hydrogenation in the presence of a catalyst selected from the group consisting of metals of group VIII of the periodic table in a salt solution having an ionic strength of at least 0.6, the solvent for said salt solution being a solvent for N,N'-dinitrosopiperazine selected from the group consisting of water, 1–3 carbon alkanols, and mixtures of water and 1–3 carbon alkanols, and the salt in said salt solution having a cation selected from the group consisting of metal and ammonium ions, and an anion selected from the group consisting of halide, sulfate, phosphate, nitrate, carbonate, borate, silicate, sulfonate and carboxylate ions.

References Cited in the file of this patent

UNITED STATES PATENTS

| | | |
|---|---|---|
| 2,725,384 | Burness | Nov. 29, 1955 |
| 2,913,453 | Peterson et al. | Nov. 17, 1959 |
| 2,979,505 | Tuemmler | Apr. 11, 1961 |

OTHER REFERENCES

Bergman: The Chemistry of Acetylene and Related Compounds, page 80, Interscience Publishers, Inc., New York, 1948.

Hydrazine and Its Derivatives, The Royal Institute of Chemistry, Lectures, Monographs and Reports, 1957, No. 5, pages 21–23.